United States Patent
Pelletier et al.

(10) Patent No.: US 8,811,529 B1
(45) Date of Patent: Aug. 19, 2014

(54) POWER LINE COMMUNICATION TRANSMITTER WITH GAIN CONTROL

(75) Inventors: Dale Scott Pelletier, Crosslake, MN (US); Micheal D. Morris, Brainerd, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 288 days.

(21) Appl. No.: 13/335,367

(22) Filed: Dec. 22, 2011

(51) Int. Cl.
*H04L 25/12* (2006.01)

(52) U.S. Cl.
USPC .......................................................... 375/296

(58) Field of Classification Search
CPC .......... H04B 3/54; H04B 3/56; H04B 17/003; H04B 17/0037; H04B 2001/0416; H04B 2001/0433
USPC .......................................................... 375/296
See application file for complete search history.

(56) References Cited

U.S. PATENT DOCUMENTS

| | | | |
|---|---|---|---|
| 4,841,281 A * | 6/1989 | Melvin, Jr. .................... | 375/297 |
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 2008/0043992 A1 * | 2/2008 | Hurwitz ......................... | 379/386 |
| 2008/0304595 A1 | 12/2008 | Haug et al. | |
| 2011/0121952 A1 | 5/2011 | Bonicatto et al. | |
| 2011/0176598 A1 | 7/2011 | Kohout et al. | |
| 2011/0218686 A1 | 9/2011 | McHann, Jr. et al. | |

(Continued)

*Primary Examiner* — Kevin Kim
(74) *Attorney, Agent, or Firm* — Crawford Maunu PLLC

(57) ABSTRACT

In one embodiment, a transmitter circuit is provided for transmission of data over power distribution lines using any one of a plurality of carrier frequencies. A data signal generation circuit is configured to encode data bits using a selected carrier frequency. A signal strength module adjusts the signal strength of the data signal according to a signal strength setting, to produce an amplified data signal. A coupling circuit communicates, using a coupling capacitor, the amplified data signal. A current sensing circuit senses current provided to the power distribution lines as a function of degradation of the coupling capacitor. A signal level control circuit adjusts a signal strength setting of the signal strength module for the selected one of the plurality of carrier frequencies as a function of the sensed current and the selected one of the plurality of carrier frequencies.

16 Claims, 6 Drawing Sheets

(56) References Cited

U.S. PATENT DOCUMENTS

| | | |
|---|---|---|
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |

* cited by examiner

POWER LINE COMMUNICATION TRANSMITTER WITH GAIN CONTROL

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout a geographic region and to receive data about the power usage. However, data communication between a central collector and many thousands of endpoint devices over power distribution lines can be a particularly challenging issue. The sheer number of endpoint devices contributes to a host of issues including synchronization, communication bandwidth and cost concerns.

For instance, the noise on power distribution lines can create problems with transmission between the many different devices. These problems can include the signal strength relative to noise. The signal strength can be set to a high value using a suitable amplifier; however, it can be desirable to keep the signal strength low due to various considerations (e.g., adjacent channel interference). Unfortunately, the effective signal strength on the power distribution lines can vary according to parameters other than the amplification, and these parameters can vary over time and based upon the particular communication frequency.

SUMMARY

The present disclosure is directed to systems and methods for use with devices that communicate over power distribute lines that are subject to varying impedances. These and other aspects of the present disclosure are exemplified in a number of illustrated implementations and applications, some of which are shown in the figures and characterized in the claims section that follows.

In one embodiment, a transmitter circuit is provided for transmission of data over alternating current (AC) power distribution lines. The transmitter includes a data signal generation circuit configured to select one of a plurality of carrier frequencies, and encode data bits using a carrier signal of the selected frequency to produce a first data signal. A signal strength module is configured to adjust a signal strength of the first data signal to produce a second data signal. A coupling circuit of the transmitter is configured to communicatively couple the second data signal from the amplifier circuit to the power distribution lines and to filter a frequency of the AC of the power distribution lines. A current sensing circuit of the transmitter is configured to sense current provided to the power distribution lines by the coupling circuit. A signal level control circuit is configured to adjust a signal strength setting of the signal strength module as a function of the sensed current and the selected one of the plurality of carrier frequencies.

In another embodiment, a method is provided for communicating over power distribution lines that carry power using AC that operates at a power-line frequency. One of a plurality of carrier frequencies is selected and a carrier signal of the selected frequency is encoded with received data to produce a first data signal. A signal strength of the first data signal is adjusted, according to a signal strength value, to produce a second data signal. The second data signal is communicated from the amplifier circuit to the power distribution lines in a manner such that the power-line frequency is filtered between the amplifier circuit and the power distribution lines and high voltage from the power distribution lines is prevented from damaging the amplifier. Current provided to the power distribution lines by the coupling circuit is sensed. The signal strength value is adjusted as a function of the sensed current and the selected one of the plurality of carrier frequencies.

In yet another embodiment, a transmitter is provided for transmitting data over AC power distribution lines which transmit power at a power-line frequency. A first circuit is configured to select one of a plurality of carrier frequencies. The first circuit also modulates a carrier signal, having the selected one of the plurality of carrier frequencies, to encode data bits to produce a first data signal. A second circuit is configured to adjust a signal strength of the first data signal according to a signal strength value to produce a second data signal. A third circuit is configured to communicate the second data signal from the second circuit to the power distribution lines, and filter the power-line frequency between the second circuit and the power distribution lines. A fourth circuit is configured to sense current provided to the power distribution lines by the third circuit. A fifth circuit is configured to adjust the signal strength value as a function of the sensed current and the selected one of the plurality of carrier frequencies.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which:

FIG. 1-B shows a block diagram of an endpoint transceiver circuit, consistent with embodiments of the present disclosure;

Figure 1A:
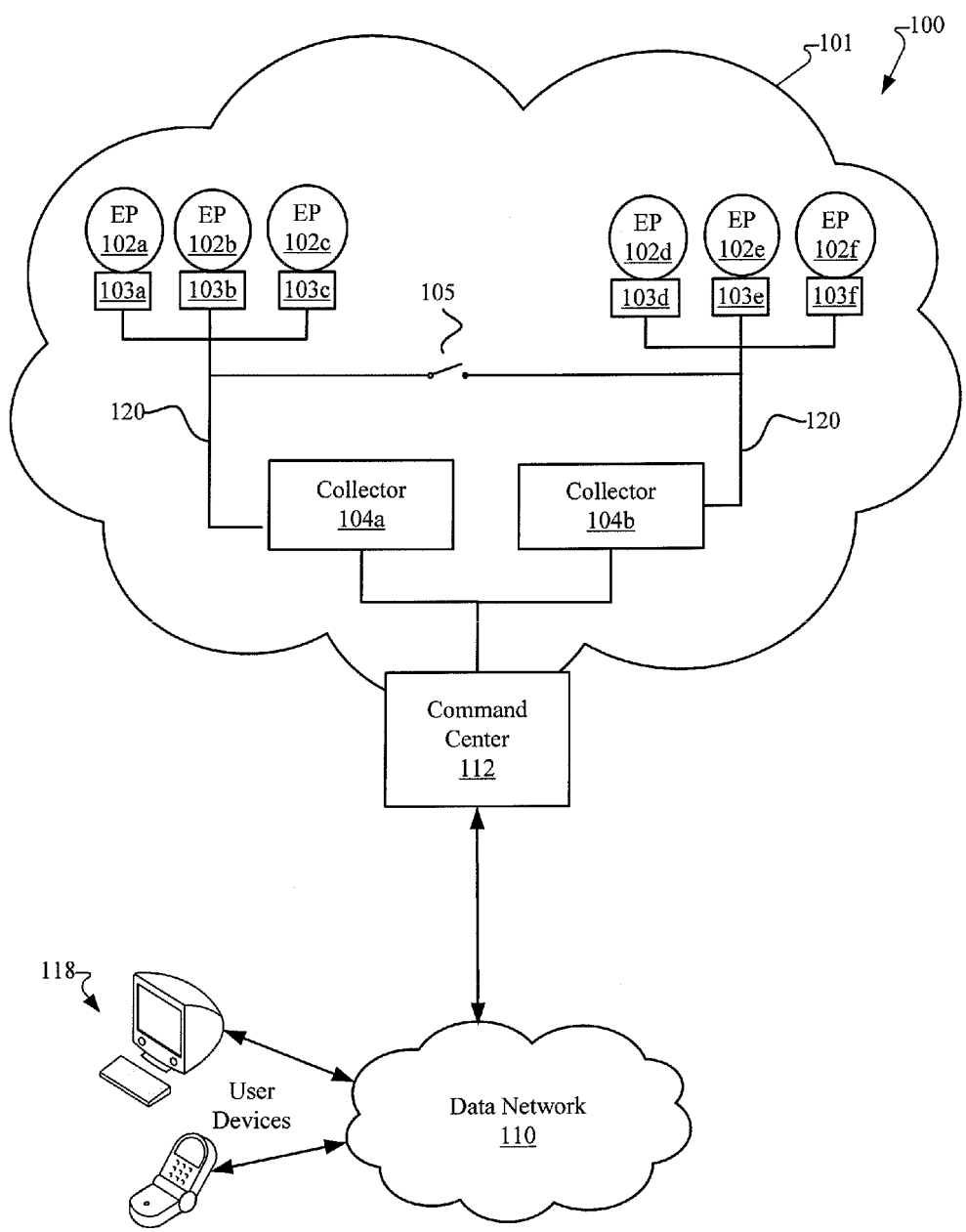
FIG. 1-A is a block diagram of an example network environment having endpoints configured for transmission of data over a power distribution network, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems, and arrangements for adjusting signal strength to compensate for varying transmission parameters. While the present disclosure is not necessarily limited to such applications, various aspects of the invention may be appreciated through a discussion of various examples using this context.

Example embodiments of the instant disclosure include various methods and circuits for processing and transmission of data signals using a carrier signal selected from a plurality of frequency bands. In one or more embodiments, a transmitter is configurable to use any of a plurality of different frequency bands for transmission. However, impedance characteristics of the transmitter and load may vary across different frequencies. Accordingly, selection of a new frequency band for transmission may change in impedance. Additionally, impedance characteristics may also change over time due to degradation of coupling capacitors used in the transmitter. The power line itself also can have impedance changes over time due to various external factors, such as, the addition and removal of other endpoint devices, reconfiguration of the network to balance power loads, environmental factors (e.g. frost on the power lines), etc.

A particular source of impedance change relates to the degradation of a capacitor designed for coupling to power distribution lines. Power distribution lines can carry significantly high voltage (e.g., in the range 100-480 V on the end-user side). Accordingly, the coupling capacitor can be designed to handle such high voltages, while also being designed to accommodate that coupling of the communication signals. Such coupling capacitors, however, can suffer from performance degradation over time. For instance, leakage in the capacitor can increase. This or other degradation can cause changes in the equivalent resistance (ESR) of the capacitor relative to the communications signals. This can adversely affect the signal strength of the communications signals on the power distribution lines.

Changes in impedance in the transmitter or load may result in unintended increases/decreases in the amplitude of transmitted signals. If the amplitude at which the data are transmitted is too low, the collectors may not receive the data that are transmitted by the endpoint devices. However, if the amplitude of the transmitted signal is too high, the noise may be introduced in adjacent frequency bands, which may interfere with proper communication on those frequencies.

In one or more embodiments, a transmitter may configure the gain of an amplifier circuit to compensate for changes in amplitude when switching frequency bands is used for transmission. The transmitter includes a circuit to select one of a plurality of carrier frequencies and modulate the carrier signal to encode data bits to produce the first data signal. An amplifier amplifies the first data signal to produce a second data signal used for transmission over the power distribution lines. A current sensing circuit of the transmitter is configured to sense current of the second data signal provided to the power distribution lines by the coupling circuit. A gain control circuit adjusts the gain of the amplifier circuit as a function of the sensed current and the selected one of the plurality of carrier frequencies.

Consistent with the instant disclosure, certain embodiments are directed to communications between multiple endpoint devices and multiple collector devices of a power distribution network. The communications between these endpoint devices and collector devices occur over power distribution lines (carrying power using alternating current (AC)).

In some embodiments, the gain control circuit determines suitable gain by setting the gain of the amplifier circuit to the lowest gain setting of the amplifier circuit. Output current of the transmitter is measured and, in response to the measured current being less than a reference current, the gain control circuit increases the gain of the amplifier circuit. When the measured current reaches the reference current, a suitable gain has been achieved.

In some embodiments, the transmitter is configured to continue monitoring the output current after configuring the gain of the amplifier. If load impedance changes, e.g., as a result of coupling capacitor degradation or adding/removing endpoint devices from the power line distribution network, the impedance change can be detected by a change in the output current. In response to changes in load impedance, the gain control circuit determines a suitable gain and adjusts the gain of the amplifier accordingly.

Consistent with various embodiments of the present disclosure, the power distribution lines can carry power that is provided from one or more generating stations (power plants) to residential and commercial customer sites alike. The generating station uses AC to transmit the power long distances over the power distribution lines. Long-distance transmission can be accomplished using a relatively high voltage. Substations located near the customer sites provide a step-down from the high voltage to a lower voltage (e.g., using transformers). Power distribution lines carry this lower voltage AC from the substations to the customer sites. Depending upon the distribution network, the exact voltages and AC frequencies can vary. For instance, voltages can generally be in the range 100-480 V (expressed as root-mean-square voltage) with two commonly used frequencies being 50 Hz and 60 Hz. In the United States, for example, a distribution network can provide customer sites with 120 V and/or 480 V, at 60 Hz.

Figure 1B:
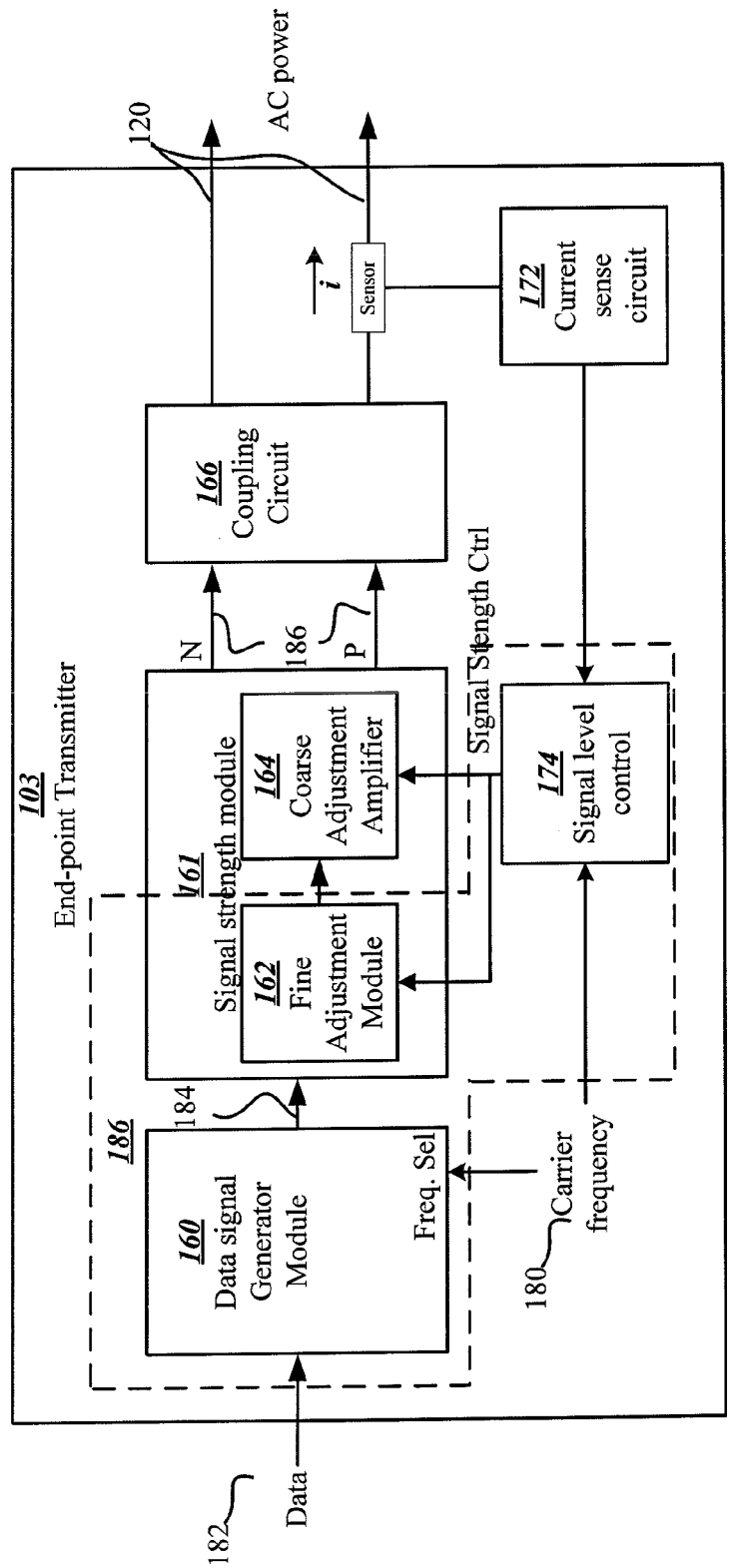

FIG. 1-A is a block diagram of an example power line communication (PLC) network environment 100 in which endpoints 102 communicate data with collector units, consistent with embodiments of the present disclosure. The network environment 100 includes a service network 101 in which a plurality of endpoint devices 102a-102f are coupled (e.g., communicatively coupled) to collector units 104a, 104b. Consistent with embodiments of the present disclosure, the endpoints 102 can provide data from utility meters. For instance, data can be provided from power meters, gas meters and/or water meters, which are respectively installed in gas and water distribution networks. For ease of description the embodiments and examples are primarily described with reference to endpoints 102 as providing utility data (e.g., power) metering over a power distribution network. However, the embodiments are not so limited and it is understood that other data can also be communicated by endpoint devices.

Data communication over utility distribution networks is difficult due to the environment of the transmission mediums and the sheer number of endpoint devices, which contribute to a host of issues including synchronization, communication bandwidth and cost concerns. For example, data transmitters for distribution lines must be able to handle high voltages inherently present on the power lines. The power distribution network 100 shown in FIG. 1-A may also exhibit dynamic impedance changes which may make communication difficult due to coupling capacitor degradation, addition and removal of other endpoint devices 102, reconfiguration of the network to balance power loads (via switch 105), reconfiguration of frequency bands assigned to the transmitters, environmental factors, etc. As a result, of the impedance changes of the network, endpoint transmitters 103 may need to adjust the amplitude of signals transmitted to collectors 104. As discussed further with reference to FIG. 1-B below, in one of more embodiments the endpoint transmitter 103 may also be configured to detect and adjust gain of the transmitter 103 in response to impedance changes.

The endpoints 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

When the endpoints 102 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage).

In FIG. 1, endpoints 102a-102c and 102d-102f transmit data over power distribution lines to collector units 104a, 104b, respectively. The collector units 104 can include circuitry (e.g., including one or more data processors) that is configured and arranged to communicate with the endpoints over power distribution lines. The collector units 104 can also include circuitry for interfacing with a command center 112 at a local utility office or other location. The interface to the command center 112 can be implemented using a variety of different communication networks including, but not limited to, a wide-area network (WAN) using Ethernet.

According to certain embodiments of the present disclosure, the collectors may be installed in power stations, power substations, transformers, etc. to control bidirectional communication between the command center 112 (e.g., located at a utility office) and endpoints (e.g., located at metering locations for customer sites). This messaging to the endpoints can be sent to an individual endpoint, or broadcast simultaneously to group of endpoints or even sent to all endpoints connected to the collectors 104. Consistent with certain embodiments, the collectors 104 are built according to an industrial-grade computer specification in order to withstand the harsh environment of a substation.

In some embodiments, a collector may take action based on the data received from the endpoints and transmit data received from the endpoints to the command center 112. For example, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received by the command center 112 via data network 110. For example, the user devices 118 might be owned by utility provider operator, maintenance personnel and/or customers of the utility provider. For example, data identifying the increased power usage described above can be provided to a user device 118, which can, in turn, determine an appropriate action regarding the increased usage. Additionally, data identifying a time-of-use measure and/or a peak demand measure can also be provided to the user device 118. Similarly, if there has been a power outage, the command center 112 can provide data to user devices 118 that are accessible by customers to provide information regarding the existence of the outage and potentially provide information estimating the duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Endpoints transmitters 103 may be configured to transmit data to collectors 104 using a number of different data modulation techniques, including frequency shift keying (FSK), phase shift keying (PSK, e.g., Quadrature PSK or 8PSK), multiple frequency shift keying (MFSK, e.g., 2 of 9, or 2 of 46 MFSK), Quadrature Amplitude Modulation (QAM, e.g., 16 or 256 QAM), etc. Encoded data symbols from a particular endpoint may be transmitted over one of thousands of communications channels in a PLC system. Communications channels may be allocated from various portions of spectrum over which data are transmitted. The center frequency and bandwidth of each communications channel can depend on the communications system in which they are implemented. In some implementations, multiple communication channels may use time slots to operate in one or more shared frequency bands. For example, each endpoint can be assigned a particular channel according to an orthogonal frequency division multiple access (OFDMA) or another channel allocation technique. Channel assignments for the endpoints 102a-102c, 102d-102f that communicate with particular collectors 104a, 104b can be stored, for example, in a database that is accessible to the command center 112 and/or the collectors 104a, 104b.

Consistent with embodiments of the present disclosure, each collector 104 can be configured to be in communication with thousands of endpoints 102, and thousands of collectors 104 can be in connection with the command center 112. For example, a single collector can be configured to communicate with over 100,000 endpoint devices and a command center can be configured to communicate with over 1,000 collectors. Thus, there can be millions of total endpoints total and many thousands of endpoints can communicate to the same collector over a shared power distribution line. Accordingly, embodiments of the present disclosure are directed toward coordinating communications using carefully designed time-based protocols and considerations.

FIG. 1-B is a block diagram of the transmitter circuits shown in FIG. 1-A, consistent with embodiments of the present disclosure. The transmitter can be configured to use any of a plurality of different frequency bands for transmission and to adjust gain of the transmitter based on the frequency band selected for transmission, as discussed above.

The transmitter 103 includes a data signal generator circuit 160 configured to select an indicated carrier frequency 180, and encode input data 182 using the selected carrier frequency 180, to produce a data encoded signal 184. Signal strength of the data encoded signal 184 is adjusted by signal strength module 161 to produce an amplified data signal 186.

Consistent with a particular embodiment of the present disclosure, modules 160 and 162 can be implemented in the digital domain using, for instance, a digital signal processing circuit 186. For instance, the digital signal processing circuit 186 can be configured to generate an output signal 184 that is encoded according to the desired data modulation technique. The amplitude of this output signal can be adjusted within a certain range of values provided by digital signal processing circuit 186. For instance, the digital signal processing circuit 186 might be capable of driving signals up to 5V (as a non-limiting example). The amplitude range of the encoded signal can therefore be adjusted between a minimum setting (e.g., an amplitude of 3V) and a setting up to the capabilities of the digital signal processing circuit 186. Certain embodiments recognize that the acceptable range of voltages can be set lower than the absolute maximum voltage of the digital signal processing circuit 186.

In some embodiments of the present disclosure, the fine adjustment module 162 can be configured and arranged to increase the amplitude of the encoded signal up to a certain amplitude threshold or maximum value. The coarse adjustment amplifier 164 can then be used if further signal strength increase is desired. For instance, the coarse adjustment amplifier 164 could be an amplifier circuit configured and arranged to provide significant signal amplification for transmitting signals over long distances on power distribution lines. Accordingly, the gain of the amplifier 164 can be high (relative to the output signal of the digital signal processing circuit 186) and adjustments to the gain can cause relatively large increases in signal strength. Accordingly, aspects of the present disclosure use the fine adjustment module 162 and coarse adjustment amplifier 164 in combination to provide a wide signal strength adjustment range with good granularity.

Consistent with certain embodiment of the present disclosure, the signal amplitude set by the fine adjustment module 162 is increased until a high threshold value is reached. Thereafter, the signal amplitude set by the fine adjustment module 162 is set to a low threshold value while the gain of the coarse adjustment amplifier 164 is increased.

A current sense circuit 172 measures a current output from the transmitter 103 to the power distribution lines 120. Signal level control circuit 174 determines a signal strength adjustment. This adjustment can be carried out by one or both of the fine adjustment module 162 and the coarse adjustment amplifier 164 as a function of the carrier frequency and the sensed output current. Consistent with some embodiments of the present disclosure, the signal level control circuit 174 can be implemented using the digital signal processing circuit 186.

In one example, configuration of the data signal 184 is a single ended signal and amplified signal 186 is a differential signal. However, it is recognized that the data signal generator 160 and amplifier 164 may be configured to process and/or output signals in either a single ended or differential format.

The amplified data signal 186 is communicated to power distribution lines 120 for transmission by coupling circuit 166. The coupling circuit 166 filters the frequency of the AC power on the power distribution lines 120 and prevents high voltages of the power distribution lines 120 from damaging the amplifier circuit 164. The coupling circuit may be implemented, for example, using a transformer to isolate the power distribution lines from the low-pass filter and/or amplifier. A series capacitor can be implemented on the primary side of a transformer and a series capacitor can be implemented on the secondary side of the transformer. The resulting transformer-capacitor circuit of the coupling circuit can be configured to provide, for example, a band pass signal path. The band pass can be configured to pass signals in a frequency range used for communication, while also blocking the AC power line frequency from affecting the output of the amplifier. A number of different frequency ranges may be used for the band pass signal path. For instance, signal frequencies of 500 Hz-100 KHz can be used in certain, non-limiting embodiments. It has been discovered that a 2 KHz-20 KHz range surprisingly provides quality communication channels over long distances.

Consistent with embodiments of the present disclosure, the coupling capacitor(s) of the coupling circuit 166 are subject to degradation. This degradation can occur over long periods of time and can be unpredictable due to variations in each capacitor and to the use of the capacitor (e.g., load conditions, voltage surges, temperature variations and other variables). Accordingly, aspects of the present disclosure are directed toward a circuit and method designed to provide signal strength adjustment to compensate for this degradation. For instance, the signal level control circuit 174 can be designed to provide amplification that is sufficient to compensate for an expected amount of capacitor degradation (e.g., a worst case scenario). Aspects of the present disclosure recognize, however, that it can be undesirable to transmit at power levels set according to the worst case scenario. Accordingly, the signal level control circuit can be configured to begin transmissions at a low or minimum signal strength value. The signal level control circuit 174 can then gradually increase the signal strength settings until a desired current (sensed by current sense circuit 172). If the capacitor has degraded significantly, the required signal strength setting can be relatively high, whereas, if a capacitor has little or no degradation, the required signal strength setting can be relatively low.

Particular embodiments of the present disclosure are directed toward correlating the desired current to a particular amplifier gain using the sensed current (e.g., by gradually adjusting the amplifier gain until the sensed current matches a desired current). In one embodiment, the sensed current can be compared against a threshold value. The signal strength of the signal strength module can then be gradually increased (e.g., by increasing the signal strength using one or both of adjustment modules 162 and 164) until the threshold value is met or exceeded. Because the capacitor degradation (and other impedance varying parameters) can happen subsequent to the initial setting of the signal strength, the signal level control circuit 174 can continue to monitor the current and adjust the signal strength. In some implementations, the monitoring and associated signal strength adjustment can be continuously provided. This continuous adjustment can be implemented using a hysteresis designed to reduce signal strength setting oscillations and overcompensation. In other implementations, the monitoring and associated signal strength adjustment can be periodic (e.g., once every minute) or triggered by an event (e.g., responsive to an indication of data losses, which might be caused by impedance mismatches). Consistent with certain embodiments, the target current setting can be adjusted using a configuration setting that can be adjusted based upon configuration data received over the power distribution lines. This can be particularly useful for allowing adjustment to one or more endpoints after deployment.

Aspects of the present disclosure are also directed toward how the sensed current may be correlated to the signal strength setting. For instance, parameters in addition to the sensed current can be used to determine the signal strength setting. These parameters can include, but are not limited to, the carrier frequency, the noise floor (at the carrier frequency or otherwise) and/or the bit error rate. For instance, a higher current setting can be selected if both the noise floor and the bit error rate are poor. In another instance, the current setting can vary according to the carrier frequency (channel) assigned to the endpoint. This can include measuring the current relative to the carrier frequency (e.g., using a fast-Fourier transform) and/or different desired current levels for different carrier frequencies. For instance, a lookup table or algorithm could correlate the carrier frequency with a desired current level.

Consistent with other embodiments of the present disclosure, the circuit can be configured to generate an alert in response to determining that the coupling capacitor has degraded beyond an acceptable point. For instance, the alert can be generated in response to determining that the gain of the amplifier circuit has reached the upper limit or is set beyond a threshold level. This can indicate that the coupling capacitor has degraded to a point beyond the compensation capabilities of the amplifier circuit. Accordingly, an alert message can be generated to allow for service or replacement. Particular embodiments allow for tracking of signal strength settings over a longer period of time, such as several months or years. The alert can be generated in response to the gain settings having degraded over the longer period of time, but not immediately sent of a temporarily-high gain setting. This can be useful for avoiding false alerts due to temporary line conditions. Further embodiments can provide the tracked data to a command center, which can consolidate and review data from many different devices to help predict coupling capacitor failures across the many different devices.

Figure 2:
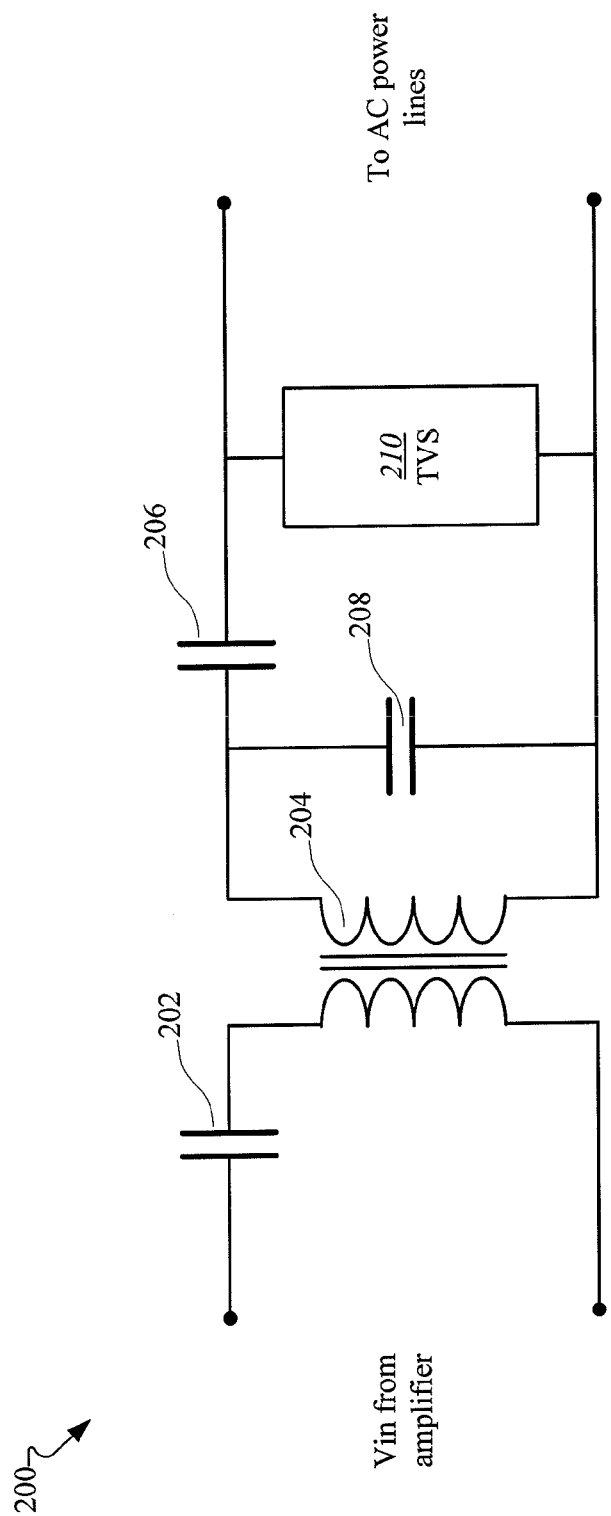
FIG. 2 shows a circuit that can be used to implement the decoupling circuit shown in FIG. 1-B, consistent with embodiments of the present disclosure.

FIG. 2 shows a circuit that may be used to implement the decoupling circuit shown in FIG. 1-B, consistent with embodiments of the present disclosure. In this example, the coupling circuit 200 is implemented using a transformer 204 and a number of capacitors to couple signals to power distribution lines and match impedances. A first capacitor 206 is coupled in series with the primary side of a transformer and a second capacitor 202 is coupled in series with the secondary side of the transformer. A capacitor 208 and transient voltage suppression (TVS) circuit 210, e.g. electrostatic discharge (ESD), are also coupled in parallel with the transformer on the primary side. This example implementation is provided for illustrative purposes. It is understood that other known coupling circuit arrangements may be used to implement the coupling circuit shown in 1-B as well.

As mentioned above, performance of capacitors used in the coupling circuit 200 may degrade over time and use. As a result, impedance characteristics may change and affect performance of the transmitter circuit. The signal strength adjustments implemented by one or more embodiments, may be used to compensate for this capacitor degradation.

Figure 3:
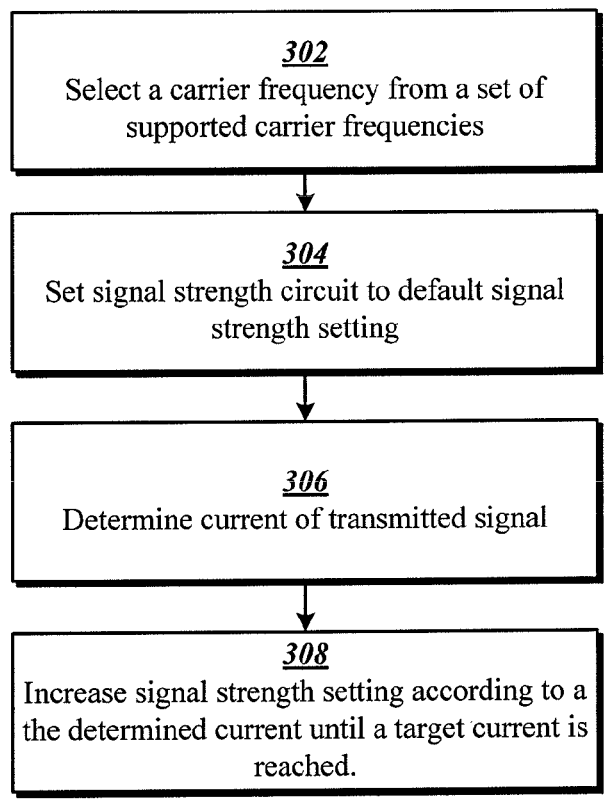
FIG. 3 shows a flowchart of a method for channel configuration of the transmitter circuit, consistent with embodiments of the present disclosure.

FIG. 3 shows a flowchart of a method for channel configuration of the transmitter circuit in accordance with one or more embodiments. A carrier frequency is selected at block 302 from a set of supported carrier frequencies. The carrier frequency may be assigned by a collector or may be determined by the transmitter based on availability and use of frequency bands by other endpoints. For example, each endpoint can be assigned a particular channel according to an orthogonal frequency division multiple access (OFDMA) or another channel allocation technique.

An amplifier of the transmitter may be set to a default signal strength setting at block 304. The amplified signal is transmitted, as discussed above, and current of flow from the transmitter to the power distribution lines resulting from the transmitted signal is determined at block 306. The signal strength setting is increased at block 308 until the current of the transmitted signal reaches a target current level. In some embodiments, a target current may be determined as a function of the selected carrier frequency.

Figure 4:
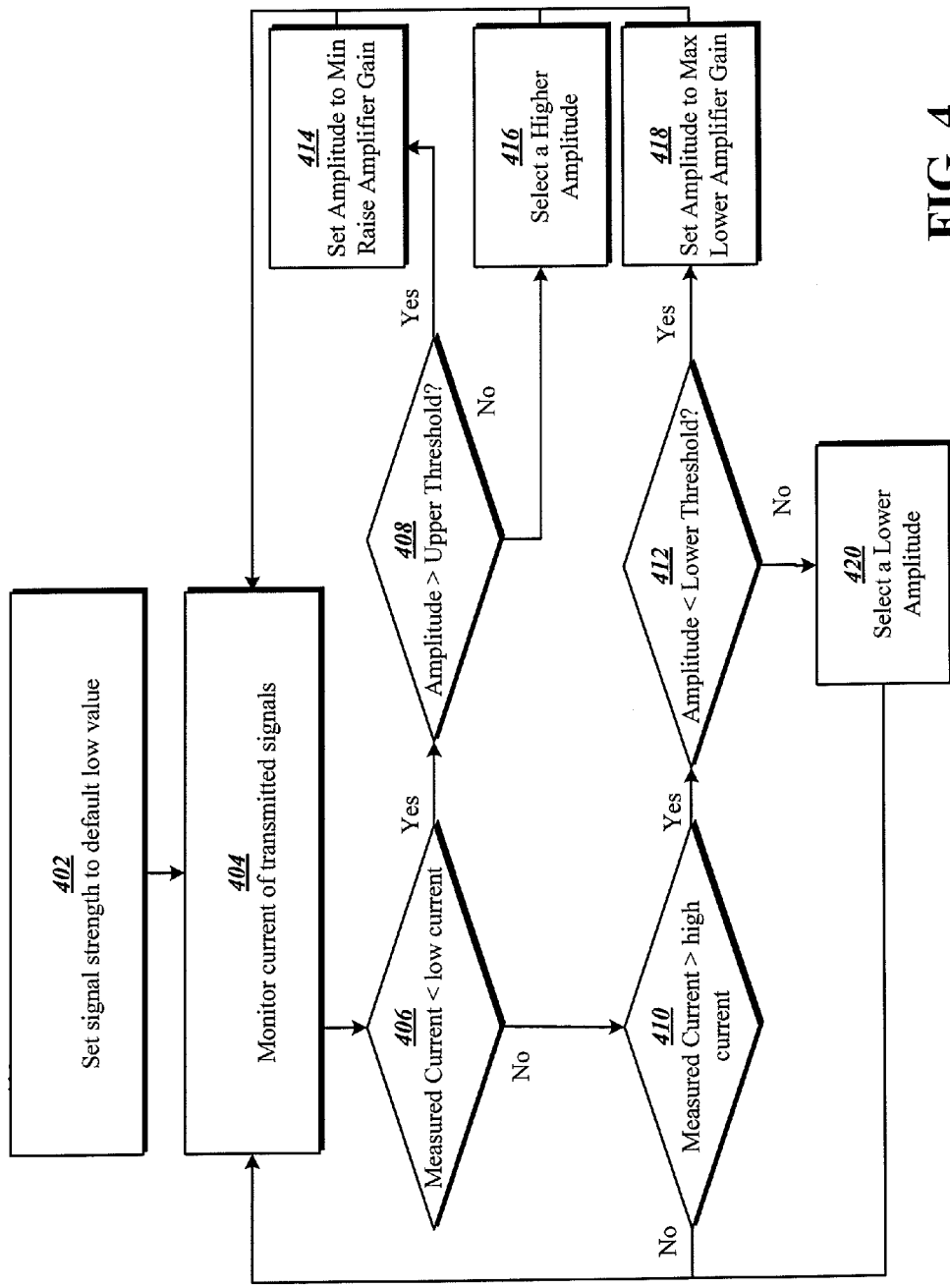
FIG. 4 shows a flowchart of a method for configuration of gain of a transmitter circuit, consistent with embodiments of the present disclosure.

FIG. 4 shows a flowchart of a method for adjustment of the signal strength gain of a transmitter circuit in accordance with one or more embodiments. Signal strength is set to a default low value at block 402. Current is repeatedly monitored at block 404 and the signal strength setting is incrementally increased until the current is equal to a low current level at decision block 406.

In some embodiments, the process may exit once the low current level is met at decision block 406. In some other embodiments, as shown here, the transmitter may continue to monitor the current at block 404 and adjust gain in response to changes in the current. If the measured current falls below a low threshold current level at decision block 406, the signal strength is increased. Otherwise, if the measured current falls below a low threshold at decision block 410, the signal strength is decreased. The high and low thresholds can be set at different values that surround the desired current level, which can be useful for reducing oscillations caused by the feedback loop.

Certain embodiments of the present disclosure use both a coarse and fine adjustment. When the measured current falls below a lower high current level at decision block 406, the transmitter determines whether or not the signal amplitude setting (e.g., of a digital signal processor circuit) is at or above an upper threshold level at block 408. If the signal amplitude is not above the upper threshold level, then the amplitude is increased at block 416. If, however, the signal amplitude is above the upper threshold level, then the amplitude is reduced to a low/minimum value and the gain of an amplifier circuit (e.g., a line driver amplifier) is increased at block 414.

When the measured current is above an low current level at decision block 410, the transmitter determines whether or not the signal amplitude setting (e.g., of a digital signal processor circuit) is at or below an lower threshold level at block 412. If the signal amplitude is not below the lower threshold level, then the amplitude is decreased at block 420. If, however, the signal amplitude is below the lower threshold, then the amplitude is increased to a high/maximum value and the gain of the amplifier circuit is decreased at block 418. In one or more embodiments, the transmitter may be implemented using a power efficient transmitter. In such embodiments, an amplifier circuit of the transmitter is configured to convert a first data signal to a pulse-density modulation (PDM) encoded signal using high frequency pulses. PDM is a form of modulation used to represent an analog signal in a binary digital form. In a PDM encoding, specific amplitude values of the analog signal are represented by the relative density of binary data pulses. Pulse-width modulation (PWM) is one type of PDM encoding, in which pulses are evenly spaced in time at a distance corresponding to a sampling rate or encoding frequency. The amplitude of each sample is represented by the width of the corresponding pulse. The PDM encoding allows the signal to be easily amplified in binary form. In some embodiments, the PDM encoded signal may be amplified during the PDM encoding process. A low-pass filter of the transmitter is then used to filter the high frequency components of the PDM encoded signal to produce an amplified version of the original first data signal.

The particular manner in which the current sense circuit measures current can vary depending upon the particular implementation. For example, in one implementation, the current sense circuit measures voltage across a resistor on the signal path from the coupling circuit 166 to the power distribution lines. From the measured voltage, current can be determined using Ohms law (Voltage=Current*Resistance). In other implementations, current can be measured using Hall-effect sensors of current sensing transformers. In some embodiments, the amount of current is determined by measuring peak current provided to the power distribution lines 120 by the coupling circuit 166 in a moving time window. In yet some other embodiments, the current sensing circuit is configured to perform a fast Fourier transform (FFT) to determine current levels at one or more of the plurality of carrier frequencies.

Figure 5:
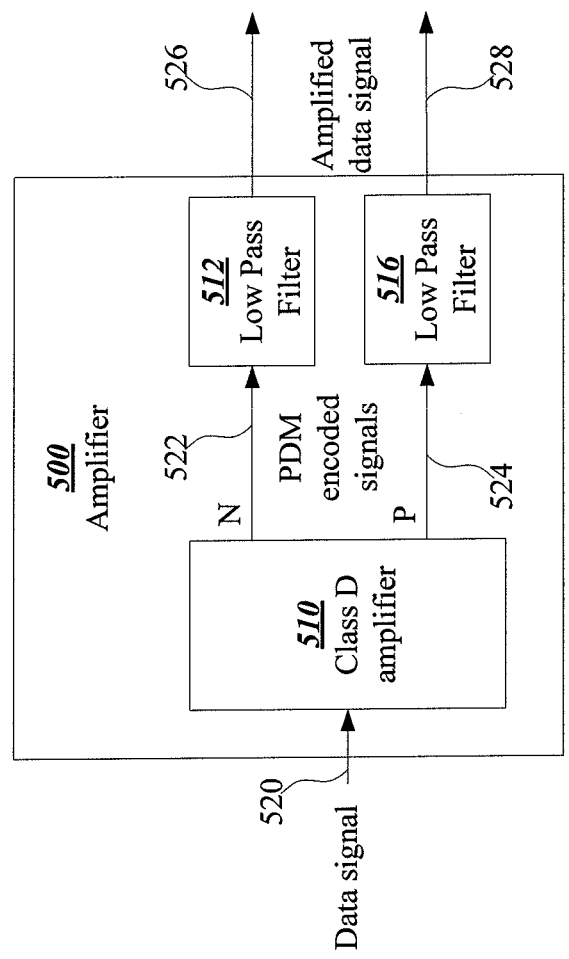
FIG. 5 shows a block diagram of an amplifier circuit, consistent with embodiments of the present disclosure.

FIG. 5 shows a block diagram of a circuit that may be used to implement the amplifier of the transmitter shown in FIG. 2. The amplifier 500 includes a Class D amplifier 510 which is used to perform PDM encoding of data signal 520. A Class D audio amplifier is a switching amplifier having an output that is either fully on or fully off. When implemented using CMOS transistor, power consumption of the amplification is significantly reduced in comparison to linear amplifier of the same output level because power is not consumed when the switching amplifier is in the fully on or fully off state, but is only consumed when switching between the two.

In this example, the Class D amplifier 510 is configured to output and convert a data signal 520 into first and second PDM encoded signals 522 and 524. However, it is recognized that amplifier 510 may alternatively be configured to generate single ended PCM encoded signals. Low-pass filters 512 and 516 are configured to filter the high frequency components of first and second PDM encoded signals 522 and 524 to produce first and second differential components 526 and 528 of the amplified data signal, which may be transmitted over the power distribution lines as discussed with reference to FIG. 1-B.

The PDM encoding uses a pulse rate frequency that is greater than a frequency of the data signal 520. This enables the low-pass filter to remove the high frequency components of the PDM encoded signal to produce an amplified version of the original data signal. Likewise, the pulse rate may also be set to be greater than the AC frequency of power distribution lines so that high-pass filtration may be used to communicate the amplified data signal to the power distribution lines while filtering the AC frequencies from the transmitter.

The signals and associated logic and functionality described in connection with the figures can be implemented in a number of different manners. Unless otherwise indicated, various general-purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations, and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, a block denoting "C=A+B" as an additive function implemented in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions, which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the invention. Based on the above discussion and illustrations, those skilled in the art will readily recognize that various modifications and changes may be made without strictly following the exemplary embodiments and applications illustrated and described herein. For instance, such changes may include variations on the mechanisms for sensing the output current. Such modifications and changes do not depart from the true spirit and scope of the present invention, including aspects set forth in the following claims.

What is claimed is:

1. A transmitter circuit configured and arranged to communicate over power distribution lines that carry power using alternating current (AC) that operates at a power-line frequency, the transmitter circuit comprising:
   a data signal generation module configured and adapted to:
   select one of a plurality of carrier frequencies; and
   modulate a carrier signal, having the selected one of the plurality of carrier frequencies, to encode data bits to produce a first data signal;
   a signal strength module configured and arranged to adjust a signal strength of the first data signal to produce a second data signal over a range of signal strength values to compensate for degradation of a coupling capacitor over time;

a coupling circuit configured and arranged to communicatively couple, using the coupling capacitor, the second data signal from an amplifier circuit to the power distribution lines and to filter the power-line frequency;

a current sensing circuit configured and arranged to sense current provided to the power distribution lines by the coupling circuit; and a signal level control module configured and arranged to adjust a signal strength value of the signal strength module in response to the second data signal and the sensed current;

wherein the signal level control module is configured and arranged to adjust the signal strength value by performing steps including:
setting the signal strength to a default one of the signal strength values; and
in response to the sensed current being less than a reference current, setting the signal strength to a higher one of the signal strength values; and wherein, in response to a configuration command indicating a threshold current, the signal level control module is configured to store the threshold current as the reference current.

2. The transmitter circuit of claim 1, wherein the default one of the signal strength values is the lowest signal strength value in the range of signal strength values.

3. A transmitter circuit configured and arranged to communicate over power distribution lines that carry power using alternating current (AC) that operates at a power-line frequency, the transmitter circuit comprising:
a data signal generation module configured and adapted to:
select one of a plurality of carrier frequencies; and
modulate a carrier signal, having the selected one of the plurality of carrier frequencies, to encode data bits to produce a first data signal;
a signal strength module configured and arranged to adjust a signal strength of the first data signal to produce a second data signal over a range of signal strength values to compensate for degradation of a coupling capacitor over time;
a coupling circuit configured and arranged to communicatively couple, using the coupling capacitor, the second data signal from an amplifier circuit to the power distribution lines and to filter the power-line frequency;
a current sensing circuit configured and arranged to sense current provided to the power distribution lines by the coupling circuit; and
a signal level control module configured and arranged to adjust a signal strength value of the signal strength module in response to the second data signal and the sensed current, wherein:
the signal level control module is configured to adjust the signal strength value of the signal strength module to set the signal strength value to a target signal strength value; and
after setting the signal strength value to the target signal strength value, the signal level control module is configured and arranged to adjust the signal strength value of the signal strength module in response to changes in load impedance.

4. The transmitter circuit of claim 3, wherein the signal level control module is configured and arranged to adjust the signal strength value of the signal strength module in response to changes in load impedance by increasing the signal strength value in response to the sensed current being less than a first reference current, and decreasing the signal strength value in response to the sensed current being greater than a second reference current.

5. A transmitter circuit configured and arranged to communicate over power distribution lines that carry power using alternating current (AC) that operates at a power-line frequency, the transmitter circuit comprising:
a data signal generation module configured and adapted to:
select one of a plurality of carrier frequencies; and
modulate a carrier signal, having the selected one of the plurality of carrier frequencies, to encode data bits to produce a first data signal;
a signal strength module configured and arranged to adjust a signal strength of the first data signal to produce a second data signal over a range of signal strength values to compensate for degradation of a coupling capacitor over time;
a coupling circuit configured and arranged to communicatively couple, using the coupling capacitor, the second data signal from an amplifier circuit to the power distribution lines and to filter the power-line frequency;
a current sensing circuit configured and arranged to sense current provided to the power distribution lines by the coupling circuit; and
a signal level control module configured and arranged to adjust a signal strength value of the signal strength module in response to the second data signal and the sensed current,
wherein the current sensing circuit is configured and arranged to perform a fast Fourier transform (FFT) to determine current levels at one or more of the plurality of carrier frequencies.

6. A transmitter circuit configured and arranged to communicate over power distribution lines that carry power using alternating current (AC) that operates at a power-line frequency, the transmitter circuit comprising:
a data signal generation module configured and adapted to:
select one of a plurality of carrier frequencies; and
modulate a carrier signal, having the selected one of the plurality of carrier frequencies, to encode data bits to produce a first data signal;
a signal strength module configured and arranged to adjust a signal strength of the first data signal to produce a second data signal over a range of signal strength values to compensate for degradation of a coupling capacitor over time;
a coupling circuit configured and arranged to communicatively couple, using the coupling capacitor, the second data signal from an amplifier circuit to the power distribution lines and to filter the power-line frequency;
a current sensing circuit configured and arranged to sense current provided to the power distribution lines by the coupling circuit; and
a signal level control module configured and arranged to adjust a signal strength value of the signal strength module in response to the second data signal and the sensed current,
wherein the amount of current determined by the current sensing circuit is a peak current provided to the power distribution lines by the coupling circuit in a moving time window.

7. The transmitter circuit of claim 1, wherein the current sensing circuit includes a Hall effect sensor.

8. The transmitter circuit of claim 1, wherein the current sensing circuit includes a current sensing transformer.

9. A transmitter circuit configured and arranged to communicate over power distribution lines that carry power using alternating current (AC) that operates at a power-line frequency, the transmitter circuit comprising:
- a data signal generation module configured and adapted to:
  - select one of a plurality of carrier frequencies; and
  - modulate a carrier signal, having the selected one of the plurality of carrier frequencies, to encode data bits to produce a first data signal;
- a signal strength module configured and arranged to adjust a signal strength of the first data signal to produce a second data signal over a range of signal strength values to compensate for degradation of a coupling capacitor over time;
- a coupling circuit configured and arranged to communicatively couple, using the coupling capacitor, the second data signal from an amplifier circuit to the power distribution lines and to filter the power-line frequency;
- a current sensing circuit configured and arranged to sense current provided to the power distribution lines by the coupling circuit; and
- a signal level control module configured and arranged to adjust a signal strength value of the signal strength module in response to the second data signal and the sensed current,
- wherein the signal strength module is further configured and arranged to:
  - convert the first data signal to a pulse density modulation (PDM) encoded signal using high frequency pulses that introduce high frequency components; and
  - filter the high frequency components of PDM encoded signal to produce the second data signal, such that the second data signal is an amplification of the first data signal.

10. The transmitter circuit of claim 9, wherein the second data signal has a frequency and a phase that are the same as a frequency and phase of the first data signal, and has a greater amplitude than the first data signal.

11. A transmitter circuit configured and arranged to communicate over power distribution lines that carry power using alternating current (AC) that operates at a power-line frequency, the transmitter circuit comprising:
- a data signal generation module configured and adapted to:
  - select one of a plurality of carrier frequencies; and
  - modulate a carrier signal, having the selected one of the plurality of carrier frequencies, to encode data bits to produce a first data signal;
- a signal strength module configured and arranged to adjust a signal strength of the first data signal to produce a second data signal over a range of signal strength values to compensate for degradation of a coupling capacitor over time;
- a coupling circuit configured and arranged to communicatively couple, using the coupling capacitor, the second data signal from an amplifier circuit to the power distribution lines and to filter the power-line frequency;
- a current sensing circuit configured and arranged to sense current provided to the power distribution lines by the coupling circuit; and
- a signal level control module configured and arranged to adjust a signal strength value of the signal strength module in response to the second data signal and the sensed current,
- wherein the signal strength module includes:
  - a first amplification module configured and arranged to amplify the first data signal to produce an intermediate signal; and
  - a second amplification module configured and arranged to amplify the intermediate signal to produce the second data signal.

12. The transmitter circuit of claim 9, wherein the signal strength module includes first and second amplification modules, wherein one of the first and second amplification modules is configured and arranged to perform fine amplitude adjustment and the other one of the first and second amplification modules is configured to perform coarse amplitude adjustment.

13. A method for communicating over power distribution lines that carry power using alternating current (AC) that operates at a power-line frequency, the method comprising:
- selecting one of a plurality of carrier frequencies;
- modulating a carrier signal, having the selected one of the plurality of carrier frequencies, to encode data bits to produce a first data signal;
- adjusting a signal strength of the first data signal, according to a signal strength value, to produce a second data signal;
- communicating, using a coupling capacitor, the second data signal from an amplifier circuit to the power distribution lines;
- filtering the power-line frequency between the amplifier circuit and the power distribution lines;
- sensing current provided to the power distribution lines by the coupling capacitor, the current responsive to degradation of the coupling capacitor over time; and
- adjusting the signal strength value in response to the sensed current including:
  - setting the signal strength value to a target signal strength value; and
  - adjusting the signal strength value in response to changes in load impedance, by performing steps including:
    - increasing the signal strength value in response to the sensed current being less than a first reference current; and
    - decreasing the signal strength value in response to the sensed current being greater than a second reference current.

14. The method of claim 13, wherein the signal strength value is adjusted as a function of the sensed current and the selected one of a plurality of carrier frequencies.

15. A method for communicating over power distribution lines that carry power using alternating current (AC) that operates at a power-line frequency, the method comprising:
- selecting one of a plurality of carrier frequencies;
- modulating a carrier signal, having the selected one of the plurality of carrier frequencies, to encode data bits to produce a first data signal;
- adjusting a signal strength of the first data signal, according to a signal strength value, to produce a second data signal;
- communicating, using a coupling capacitor, the second data signal from an amplifier circuit to the power distribution lines;
- filtering the power-line frequency between the amplifier circuit and the power distribution lines;
- sensing current provided to the power distribution lines by the coupling capacitor, the current responsive to degradation of the coupling capacitor over time; and
- adjusting the signal strength value in response to the sensed current, wherein the adjusting the signal strength of the first data signal to produce the second data signal includes:

converting the first data signal to a pulse density modulation (PDM) encoded signal using high frequency pulses that introduce high frequency components; and filtering the high frequency components of PDM encoded signal to produce the second data signal, such that the second data signal is an amplification of the first data signal.

16. A transmitter for transmitting data over AC power distribution lines transmitting power at a power-line frequency, comprising:

a first circuit configured and adapted to select one of a plurality of carrier frequencies, and modulate a carrier signal, having the selected one of the plurality of carrier frequencies, to encode data bits to produce a first data signal;

a second circuit configured and adapted to adjust a signal strength of the first data signal according to a signal strength value to produce a second data signal;

a third circuit configured and adapted to communicate, using a coupling capacitor, the second data signal from the second circuit to the power distribution lines, and filter the power-line frequency between the second circuit and the power distribution lines;

a fourth circuit configured and adapted to sense current provided to the power distribution lines by the third circuit, the current reduced in response to degradation of the coupling capacitor; and a fifth circuit configured and adapted to determine a target signal strength value for the selected one of the plurality of carrier frequencies as a function of the sensed current and the selected one of the plurality of carrier frequencies, and set the signal strength value of the second circuit to the target signal strength value to compensate for the degradation of the coupling capacitor, wherein the second circuit is further configured and arranged to set the signal strength value to a target signal strength value; and adjust the signal strength value in response to changes in load impedance, by performing steps including:

increasing the signal strength value in response to the sensed current being less than a first reference current; and decreasing the signal strength value in response to the sensed current being greater than a second reference current.

\* \* \* \* \*